US012583332B2

(12) United States Patent
Nishimine et al.

(10) Patent No.: US 12,583,332 B2
(45) Date of Patent: Mar. 24, 2026

(54) ELECTRIC VEHICLE

(71) Applicant: TOYOTA JIDOSHA KABUSHIKI KAISHA, Toyota (JP)

(72) Inventors: Akiko Nishimine, Susono (JP); Yoichiro Isami, Mishima (JP); Yoshio Itou, Susono (JP); Hiroyuki Amano, Susono (JP); Tatsuya Imamura, Okazaki (JP); Hiroaki Ebuchi, Hadano (JP); Hiroaki Kodera, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/210,643

(22) Filed: May 16, 2025

(65) Prior Publication Data

US 2025/0276583 A1     Sep. 4, 2025

Related U.S. Application Data

(63) Continuation of application No. 18/799,020, filed on Aug. 9, 2024, now Pat. No. 12,337,700, which is a
(Continued)

(30) Foreign Application Priority Data

Aug. 7, 2020     (JP) ................................. 2020-135122

(51) Int. Cl.
*B60L 15/20* (2006.01)
*B60K 26/02* (2006.01)
(Continued)

(52) U.S. Cl.
CPC .............. *B60L 15/20* (2013.01); *B60K 26/02* (2013.01); *G06F 30/20* (2020.01); *H02P 6/08* (2013.01);
(Continued)

(58) Field of Classification Search
CPC .. B60L 15/20; B60L 2250/00; B60L 2260/24; B60L 2260/46; G06F 30/20;
(Continued)

(56) References Cited

U.S. PATENT DOCUMENTS 2,649,813 A * 8/1953 Barth .................... F16H 63/304
74/334
6,951,528 B2* 10/2005 Ewinger ............... B60T 13/741
477/906
(Continued)

*Primary Examiner* — Edwin A Young
(74) *Attorney, Agent, or Firm* — OLIFF PLC.

(57) ABSTRACT

The electric vehicle according to the present disclosure calculates motor torque using an MT vehicle model simulating an MT vehicle having a manual transmission and an internal combustion engine. In the first operation mode, an operation amount of a pseudo-clutch pedal and a shift position of a pseudo-gearshift are input to the MT vehicle model to reflect operation of the pseudo-clutch pedal and operation of the pseudo-gearshift in electric motor control. In the second operation mode where the operation of the pseudo-clutch pedal is not needed, an operation amount of a clutch pedal calculated by a driver model is input to the MT vehicle model instead of the operation amount of the pseudo-clutch pedal.

3 Claims, 12 Drawing Sheets

Related U.S. Application Data continuation of application No. 18/437,905, filed on Feb. 9, 2024, now Pat. No. 12,090,861, which is a continuation of application No. 17/349,406, filed on Jun. 16, 2021, now Pat. No. 11,932,118.

(51) Int. Cl.

| | |
|---|---|
| *G06F 30/20* | (2020.01) |
| *H02P 6/08* | (2016.01) |
| *B60K 1/00* | (2006.01) |
| *G06F 111/10* | (2020.01) |

(52) U.S. Cl.
CPC .. *B60K 2001/001* (2013.01); *B60K 2026/025* (2013.01); *B60L 2250/00* (2013.01); *B60L 2260/24* (2013.01); *B60L 2260/46* (2013.01); *G06F 2111/10* (2020.01)

(58) Field of Classification Search
CPC ................ G06F 2111/10; B60K 26/02; B60K 2001/001; B60K 2026/025; H02P 6/08
See application file for complete search history.

(56) References Cited

U.S. PATENT DOCUMENTS

| | | | |
|---|---|---|---|
| 11,117,566 B2 * | 9/2021 | Pursifull | B60W 30/182 |
| 2012/0083958 A1 * | 4/2012 | Ballard | B60W 50/10 |
| | | | 701/56 |
| 2014/0004996 A1 * | 1/2014 | Osuka | B60W 20/40 |
| | | | 903/902 |
| 2019/0344780 A1 * | 11/2019 | Ruybal | B60W 20/30 |

* cited by examiner

532

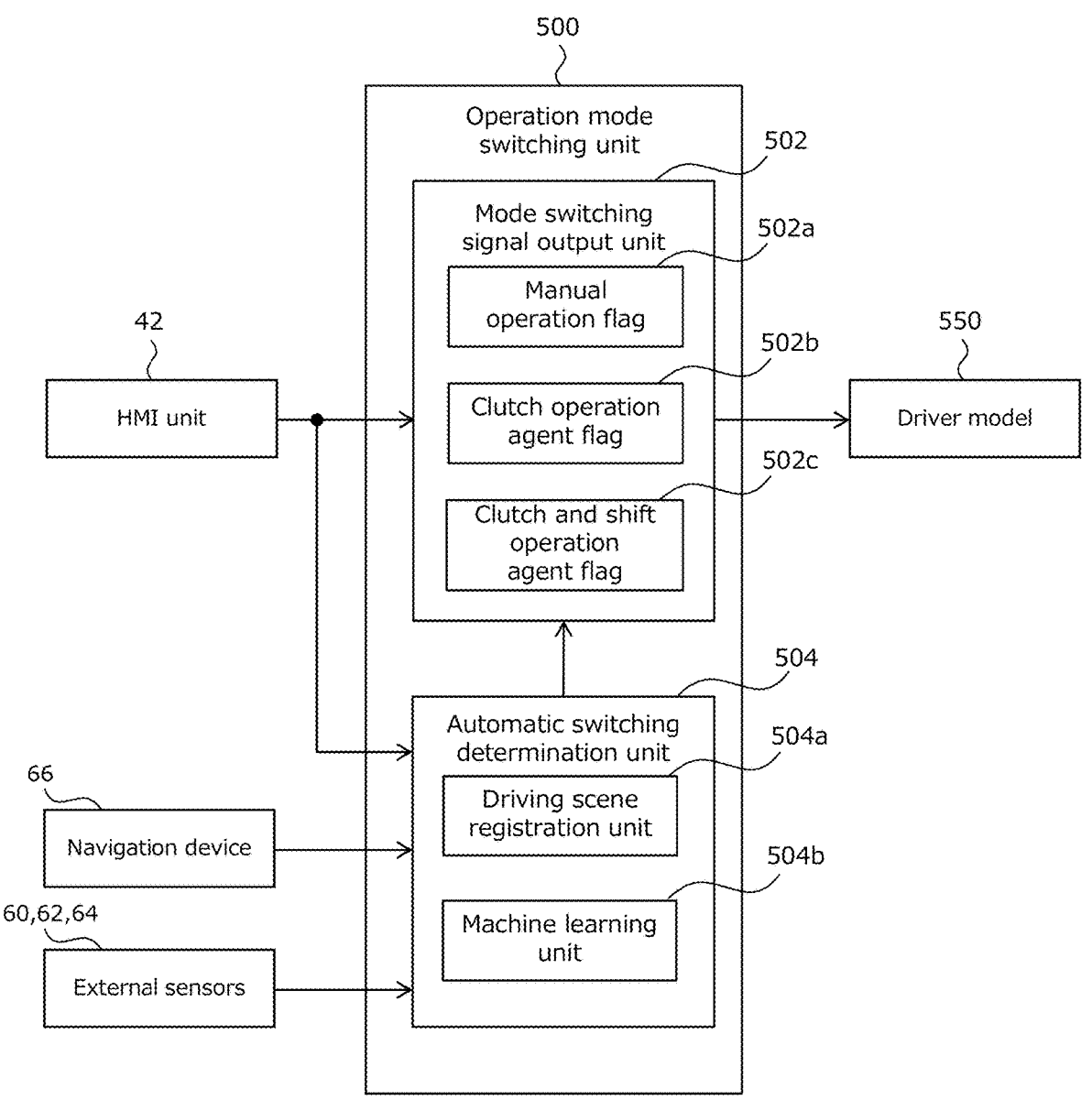
F i g. 10

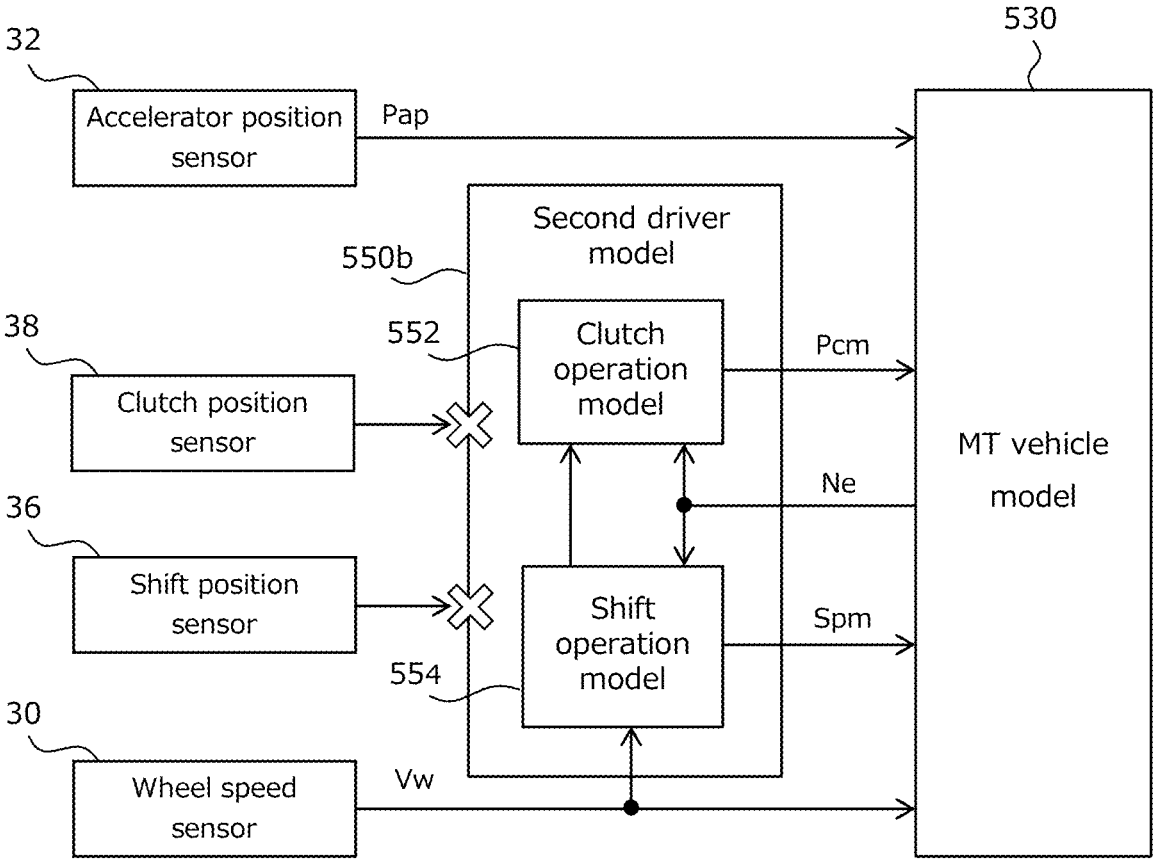
F i g. 12

ELECTRIC VEHICLE

CROSS-REFERENCE TO RELATED APPLICATION

This is a Continuation of U.S. patent application Ser. No. 18/799,020 filed Aug. 9, 2024, which in turn is a Continuation of U.S. patent application Ser. No. 18/437,905 filed Feb. 9, 2024 (now U.S. Pat. No. 12,090,861), which is a Continuation of U.S. patent application Ser. No. 17/349,406 filed Jun. 16, 2021 (now U.S. Pat. No. 11,932,118), which claims priority under 35 U.S.C. § 119 to Japanese Patent Application No. 2020-135122, filed Aug. 7, 2020. The contents of the prior applications identified above are incorporated herein by reference in their entireties.

BACKGROUND

Field

The present disclosure relates to an electric vehicle configured to use an electric motor as a power device for traveling.

Background Art

An electric motor used as a power device for traveling in an electric vehicle differs greatly in torque characteristic from an internal combustion engine used as a power device for traveling in a conventional vehicle. Due to the difference in torque characteristics of power devices, a transmission is essential for the conventional vehicle, whereas in general the electric vehicle is not equipped with a transmission. Of course, the electric vehicle is not equipped with a manual transmission (MT: Manual Transmission) that switches a gear ratio by manual operation by a driver. Therefore, there is a great difference in a driving feeling between driving of the conventional vehicle with the MT (hereinafter referred to as MT vehicle) and driving of the electric vehicle.

On the other hand, the torque of the electric motor can be controlled relatively easily by controlling the applied voltage and magnetic field. Therefore, the electric motor can obtain a desired torque characteristic within an operating range of the electric motor by implementing appropriate motor control. Taking advantage of this feature, a technique to simulate the torque characteristic peculiar to the MT vehicle by controlling the torque of the electric vehicle has been proposed so far.

JP 2018-166386 discloses a technique for producing a pseudo shift change in a vehicle that transmits torque to wheels from a drive motor. In this vehicle, at a predetermined opportunity defined by a vehicle speed, an accelerator opening, an accelerator opening speed, or a brake depression amount, after reducing the torque of the drive motor by a set variation amount, torque variation control is performed to increase the torque again at a predetermined time period. Thus, an uncomfortable feeling given to a driver familiar with a vehicle equipped with a stepped transmission is suppressed.

However, in the above technique, it is impossible to determine the timing of executing the torque variation control simulating the speed change operation voluntarily by the driver's own operation. In particular, for the driver accustomed to driving the MT vehicle, pseudo speed change operation without intervention of manual speed change operation by the driver has a possibility that a discomfort is given to the driving feeling of the driver seeking pleasure to operate the MT.

SUMMARY

In view of such circumstances, the inventors of the present application are considering providing a pseudo-gearshift and a pseudo-clutch pedal on the electric vehicle so as to obtain a feeling of driving the MT vehicle in the electric vehicle. Of course, these pseudo-devices are not simply attached to the electric vehicle. The inventors of the present application are considering allowing the electric motor to be controlled by operating the pseudo-gearshift and pseudo-clutch pedal so that the torque characteristic similar to that of the MT vehicle can be obtained.

However, it is also a fact that driving the MT vehicle involves peculiar difficulties. In particular, the operation of the clutch pedal is sometimes cumbersome and difficult operation for a modern driver familiar with driving an AT vehicle with an automatic transmission (AT). For example, it can be said that clutch operation in reverse, clutch operation in hill starting, clutch operation in a sharp curve, clutch operation in a traffic jam, clutch operation in a railroad crossing, clutch operation in a garage, and clutch operation on a gravel road are particularly difficult operation. This is a similarly possible problem when simulating the driving feeling of the MT vehicle in the EV. If the operation required by the MT vehicle is applied to the EV as it is, even the difficulty peculiar to the MT vehicle will be simulated, and the driver may not be able to enjoy the driving feeling like the MT vehicle.

The present disclosure has been made in view of the above problems, and an object thereof is to provide an electric vehicle capable of enjoying a driving feeling like an MT vehicle without experiencing difficulties peculiar to the MT vehicle.

The electric vehicle according to the present disclosure is an electric vehicle using an electric motor as a power device for traveling, comprising an accelerator pedal, a pseudo-clutch pedal, a pseudo-gearshift, an operation mode selector, and a controller. The operation mode selector is a device configured to switch an operation mode between a first operation mode and a second operation mode. The first operation mode is an operation mode reflecting operation of the pseudo-clutch pedal and operation of the pseudo-gearshift in control of the electric motor. The second operation mode is an operation mode not requiring the operation of the pseudo-clutch pedal for the control of the electric motor. The controller is a device configured to control a motor torque output by the electric motor in accordance with the control mode selected by the mode selector.

The controller comprises a memory and a processor. The memory stores an MT vehicle model and a first driver model. The MT vehicle model is a model simulating a torque characteristic of a driving wheel torque in an MT vehicle. The MT vehicle referred to herein is a vehicle having an internal combustion engine whose torque is controlled by operation of a gas pedal and a manual transmission whose gear stage is switched by operation of a clutch pedal and operation of a gearshift. The first driver model is a model simulating the operation of the clutch pedal of an exemplary driver driving the MT vehicle.

When the first operation mode is selected, the processor executes the following first to fifth processes. The first process is a process of receiving an operation amount of the accelerator pedal as an input of an operation amount of the gas pedal with respect to the MT vehicle model. The second process is a process of receiving an operation amount of the pseudo-clutch pedal as an input of an operation amount of the clutch pedal with respect to the MT vehicle model. The third process is a process of receiving a shift position of the pseudo-gearshift as an input of a shift position of the gearshift with respect to the MT vehicle model. The fourth process is a process of calculating the driving wheel torque determined from the operation amount of the gas pedal, the operation amount of the clutch pedal and the shift position of the gearshift using the MT vehicle model. Then, the fifth process is a process of calculating the motor torque for giving the driving wheel torque to driving wheels of the electric vehicle.

When the second operation mode is selected, the processor executes the following sixth to twelfth processing. The sixth process is a process of disabling the operation of the pseudo-clutch pedal. The seventh process is a process of calculating the operation amount of the clutch pedal using the first driver model. The eighth process is a process of receiving the operation amount of the accelerator pedal as the input of the operation amount of the gas pedal with respect to the MT vehicle model. The ninth process is a process of receiving the operation amount of the clutch pedal calculated using the first driver model as the input of the operation amount of the clutch pedal with respect to the MT vehicle model. The tenth process is a process of receiving the shift position of the pseudo-gearshift as the input of the shift position of the gearshift with respect to the MT vehicle model. The eleventh process is a process of calculating the driving wheel torque determined from the operation amount of the gas pedal, the operation amount of the clutch pedal and the shift position of the gearshift using the MT vehicle model. Then, the twelfth process is a process of calculating the motor torque for giving the driving wheel torque to driving wheels of the electric vehicle.

According to the electric vehicle according to the present disclosure, when the first operation mode is selected, the operation of the pseudo-clutch pedal and the operation of the pseudo-gearshift are reflected in the calculation of the motor torque using the MT vehicle model, so that the driver can enjoy clutch operation and gearshift operation like an MT vehicle. When the operation mode is switched to the second operation mode, the operation amount of the clutch pedal is calculated by the first driver model, so that the operation of the pseudo clutch pedal is not required, and the driver does not need to feel difficulties peculiar to the MT vehicle. This allows the driver to enjoy driving feeling like the MT vehicle by the electric vehicle without experiencing difficulties peculiar to the MT vehicle.

In the electric vehicle according to the present disclosure, the operation mode selector may further comprise as the operation mode a third operation mode in addition to the first operation mode and the second operation mode. The third operation mode is an operation mode not requiring the operation of the pseudo-clutch pedal and the operation of the pseudo-gearshift for the control of the electric motor. The memory may also further store a second driver model in addition to the MT vehicle model and the first driver model. The second driver model is a model simulating the operation of the clutch pedal and the operation of the gearshift of the exemplary driver driving the MT vehicle.

When the third operation mode is selected, the processor may perform the following thirteenth to nineteenth processes. The thirteenth process is a process of disabling the operation of the pseudo-clutch pedal and the operation of the pseudo-gearshift. The fourteenth process is a process of calculating the operation amount of the clutch pedal and the shift position of the gearshift using the second driver model. The fifteenth process is a process of receiving the operation amount of the accelerator pedal as the input of the operation amount of the gas pedal with respect to the MT vehicle model. The sixteenth process is a process of receiving the operation amount of the clutch pedal calculated using the second driver model as the input of the operation amount of the clutch pedal with respect to the MT vehicle model. The seventeenth process is a process of receiving the shift position of the gearshift calculated using the second driver model as the input of the shift position of the gearshift with respect to the MT vehicle model. The eighteenth process is process of calculating the driving wheel torque determined from the operation amount of the gas pedal, the operation amount of the clutch pedal and the shift position of the gearshift using the MT vehicle model. Then, the nineteenth process is a process of calculating the motor torque for giving the driving wheel torque to driving wheels of the electric vehicle.

When the operation mode is switched to the third operation mode, the operation amount of the clutch pedal and the shift position of the gearshift are calculated by the second driver model. This makes it needless to operate the pseudo-clutch pedal and the pseudo-gearshift. Therefore, the driver is released from not only clutch operation but also shift operation, which eliminates the difficulties peculiar to the MT vehicle.

The operation mode selector may be configured to switch the operation mode in accordance with a selection by the driver. Further, the operation mode selector may be configured to switch the operation mode automatically according to a driving scene in accordance with a predetermined rule. Furthermore, the operation mode selector may be configured to learn a relation between the selection by the driver and a driving scene at a time when the operation mode is switched by the driver, and switch the operation mode automatically according to the driving scene in accordance with the relation that is learned.

As described above, according to the present disclosure, it is possible to provide an electric vehicle capable of enjoying a driving feeling like an MT vehicle without experiencing difficulties peculiar to the MT vehicle.

BRIEF DESCRIPTION OF THE DRAWINGS

FIG. 10 is a diagram illustrating an example of a function of an operation mode selector provided in the controller shown in FIG. 4

FIG. 12 is a diagram illustrating a function of the driver model provided in the controller shown in FIG. 4 in a sift and clutch operation agent mode.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly designated by the numerals theoretically. Furthermore, structures and steps that are described in the embodiments shown as follows are not always indispensable to the disclosure unless specially explicitly shown otherwise, or unless the disclosure is explicitly designated by the structures or the steps theoretically.

1. CONFIGURATION OF ELECTRIC VEHICLE

Figure 1:
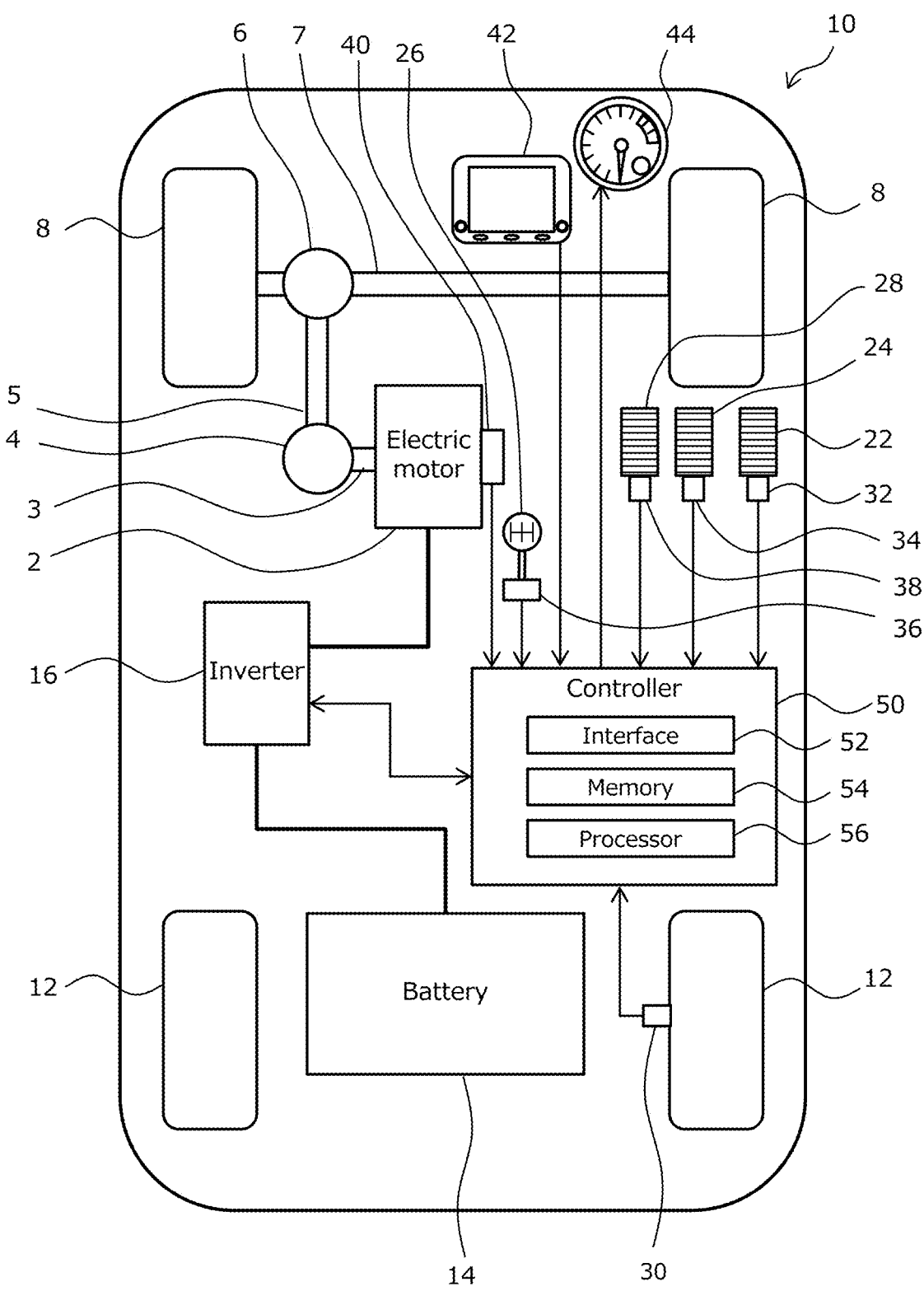
FIG. 1 is a diagram schematically illustrating a configuration of a power system of an electric vehicle according to an embodiment of the present disclosure.

FIG. 1 is a diagram schematically illustrating a configuration of a power system of an electric vehicle 10 according to the present embodiment. As shown in FIG. 1, the electric vehicle 10 is provided with an electric motor 2 as a power source. The electric motor 2 is, for example, a brushless DC motor or a three-phase AC synchronous motor. The electric motor 2 is provided with a rotation speed sensor 40 for detecting its rotation speed. An output shaft 3 of the electric motor 2 is connected to one end of a propeller shaft 5 via a gear mechanism 4. The other end of the propeller shaft 5 is connected to a drive shaft 7 at the front of the vehicle via a differential gear 6.

The electric vehicle 10 includes driving wheels 8, which are front wheels, and driven wheels 12, which are rear wheels. The driving wheels 8 are provided on both ends of the drive shaft 7, respectively. Each wheel 8 and 12 is provided with a wheel speed sensor 30. In FIG. 1, only the wheel speed sensor 30 of the right-hand rear wheel is represented. The wheel speed sensor 30 is also used as a vehicle speed sensor for detecting the vehicle speed of the electric vehicle 10. The wheel speed sensor 30 is connected to a controller 50 to be described later by an in-vehicle network such as CAN (Controller Area Network).

The electric vehicle 10 includes a battery 14 and a inverter 16. The battery 14 stores electrical energy that drives the electric motor 2. The inverter 16 converts DC power input from the battery 14 to driving power for the electric motor 2. Power conversion by the inverter 16 is performed by PWM (Pulse Wave Modulation) control by the controller 50. The inverter 16 is connected to the controller 50 by the in-vehicle network.

The electric vehicle 10 includes an accelerator pedal 22 for inputting an acceleration request and a brake pedal 24 for inputting a braking request as operation request input devices for inputting operation requests from the driver to the electric vehicle 10. The accelerator pedal 22 is provided with an accelerator position sensor 32 for detecting an accelerator opening Pap [%] which is an operation amount of the accelerator pedal 22. The brake pedal 24 is provided with a brake position sensor 34 for detecting a brake depression amount which is an operation amount of the brake pedal 24. The accelerator position sensor 32 and the brake position sensor 34 are connected to the controller 50 by the in-vehicle network.

The electric vehicle 10 further includes a pseudo-gearshift 26 and a pseudo-clutch pedal 28 as operation inputting devices. A gearshift and a clutch pedal are devices that operate a manual transmission (MT), but of course the electric vehicle 10 is not equipped with the MT. The pseudo-gearshift 26 and the pseudo-clutch pedal 28 are dummies that differ from the original gearshift and clutch pedal.

The pseudo-gearshift 26 has a structure that simulates a gearshift installed in an MT vehicle. The arrangement and operating feeling of the pseudo-gearshift 26 are equivalent to those of the real MT vehicle. The pseudo-gearshift 26 has positions that correspond to each gear stage, for example, first-speed stage, second-speed stage, third-speed stage, fourth-speed stage, fifth-speed stage, sixth-speed stage, reverse stage, and neutral stage. The pseudo-gearshift 26 is equipped with a shift position sensor 36 for detecting gear stage by determining which position the pseudo-gearshift 26 is in. The shift position sensor 36 is connected to the controller 50 by the in-vehicle network.

The pseudo-clutch pedal 28 has a structure that simulates a clutch pedal installed in the MT vehicle. The arrangement and operating feeling of the pseudo-clutch pedal 28 are equivalent to those of the real MT vehicle. When the driver wants to change the setting of the gear stage by the pseudo-gearshift 26, the driver depresses the pseudo-clutch pedal 28, and after finishing the setting change of the gear stage, ceases depressing to release the pseudo-clutch pedal 28. The pseudo-clutch pedal 28 is equipped with a clutch position sensor 38 for detecting depression amount Pc [%] of the pseudo-clutch pedal 28. The clutch position sensor 38 is connected to the controller 50 by the in-vehicle network.

The electric vehicle 10 is equipped with a pseudo-engine speed meter 44. An engine speed meter is a device that displays a rotation speed of an internal combustion engine to the driver, but of course, the electric vehicle 10 is not equipped with the internal combustion engine. The pseudo-engine speed meter 44 is, of course, a dummy that differs from the original engine speed meter. The pseudo-engine speed meter 44 has a structure that simulates the engine speed meter installed in the conventional vehicle. The pseudo-engine speed meter 44 may be a mechanical type, a liquid crystal display type, or a projection display type using a head-up display. In the case of the liquid crystal display type and the projection display type, a revolution limit may be arbitrarily set in the pseudo-engine speed meter 44. The pseudo-engine speed meter 44 is connected to the controller 50 by the in-vehicle network.

The electric vehicle 10 is equipped with an HMI (Human Machine Interface) unit 42. The driver may use the HMI unit 42 to select an operation mode relating to the operation of the pseudo-gearshift 26 and the pseudo-clutch pedal 28. In this case, the HMI unit 42 functions as an operation mode selector. Details will be described later, there are four operation modes selectable on the HMI unit 42: a manual operation mode, a clutch operation agent mode, a shift and clutch operation agent mode, and an automatic selection mode. The HMI unit 42 may be, for example, a touch panel type HMI or a voice interactive HMI. The HMI unit 42 is connected to the controller 50 by the in-vehicle network.

Figure 2:
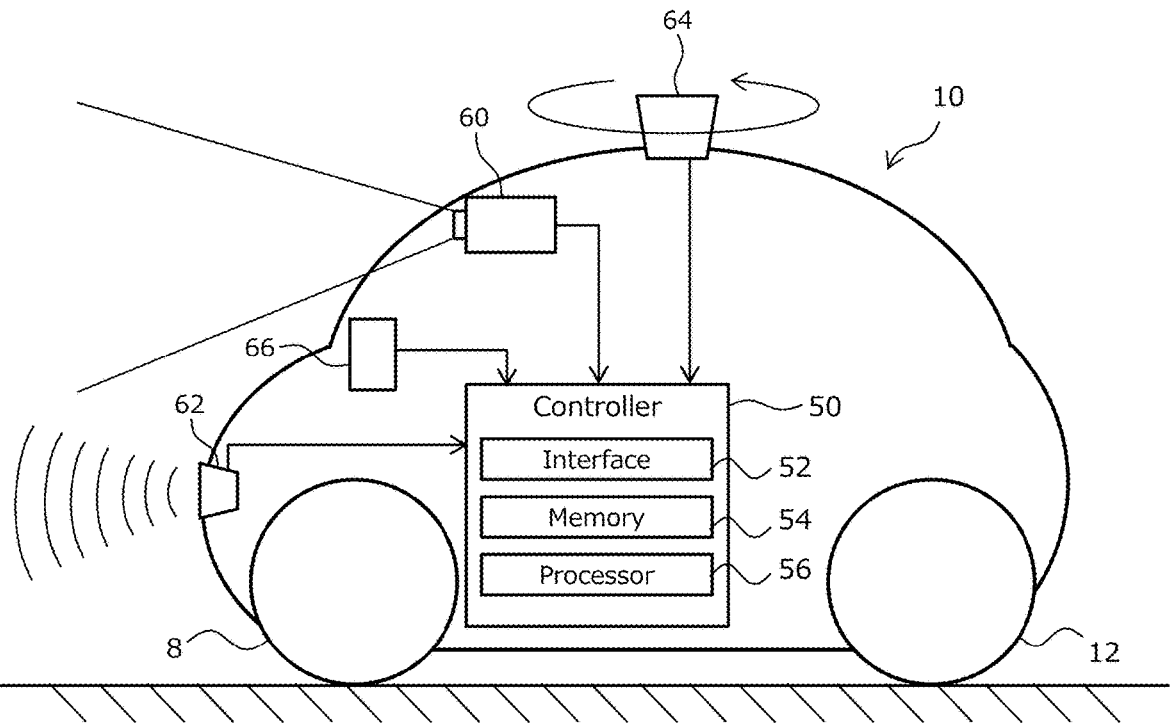
FIG. 2 is a diagram schematically illustrating a configuration of an information collection system of the electric vehicle according to the embodiment of the present disclosure.

FIG. 2 is a diagram schematically illustrating a configuration of an information collection system of the electric vehicle 10 according to the present embodiment. As shown in FIG. 2, the electric vehicle 10 includes a camera 60, a radar 62, and a LIDAR 64 as external sensors for detecting conditions in which the self vehicle is placed. The camera 60 is mounted so as to image at least the front of the self vehicle. The camera 60 is, for example, a stereo camera equipped with a CMOS image sensor. The radar 62 is specifically a millimeter wave radar and is attached to the front portion of the vehicle. The LIDAR 64 is mounted, for example, on the roof of the vehicle. Further, the electric vehicle 10 is provided with a navigation device 66 for estimating the current location of the self vehicle on a map based on map information and GPS information. Thee external sensors 60, 62, 64 and the navigation device 66 are connected to the controller 50 by the in-vehicle network.

The controller 50 is typically an ECU (Electronic Control Unit) mounted on the electric vehicle 10. The controller 50 may be a combination of a plurality of ECUs. The controller 50 includes an interface 52, a memory 54, and a processor 56. The in-vehicle network is connected to the interface 52. The memory 54 includes a RAM (Random Access Memory) for temporarily recording data and a ROM (Read Only Memory) for storing a control program executable by the processor 56 and various data related to the control program. The processor 56 executes the control program read with the related data from the memory 54, and generates a control signal based on the signal obtained from each sensor.

Figure 3:
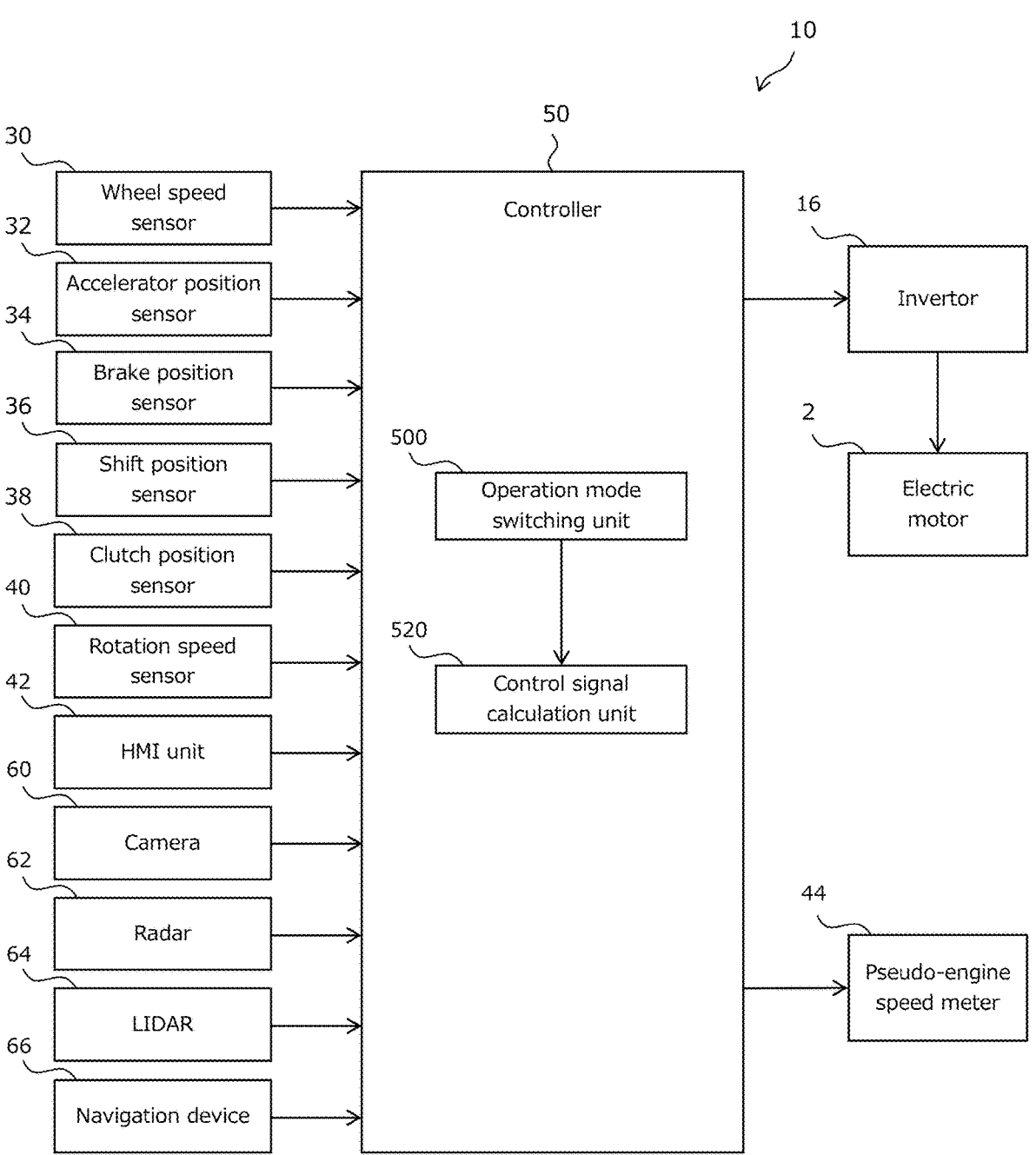
FIG. 3 is a block diagram illustrating a configuration of a control system of the electric vehicle shown in FIGS. 1 and 2.

FIG. 3 is a block diagram illustrating a configuration of a control system of the electric vehicle 10 according to the present embodiment. The controller 50 receives signals at least from the wheel speed sensor 30, the accelerator position sensor 32, the brake position sensor 34, the shift position sensor 36, the clutch position sensor 38, the rotation speed sensor 40, the HMI unit 42, the camera 60, the radar 62, the LIDAR 64, and the navigation device 66. The in-vehicle network is used for communication between these sensors and the controller 50. Although not shown, in addition to these sensors, various other sensors are mounted on the electric vehicle 10, and connected to the controller 50 by the in-vehicle network.

Further, from the controller 50, a signal is output to at least the inverter 16 and the pseudo-engine speed meter 44. The in-vehicle network is used for communication between these devices and the controller 50. Although not shown, in addition to these devices, various other actuators and indicators are mounted on the electric vehicle 10, and connected to the controller 50 by the in-vehicle network.

The controller 50 has a function as an operation mode switching unit 500 and a function as a control signal calculation unit 520. More specifically, the processor 56 functions at least as the operation mode switching unit 500 and the control signal calculation unit 520 when a program stored in the memory 54 is executed by the processor 56. The operation mode selection is a function to determine which operation mode is selected between a manual operation mode, the clutch operation agent mode, and the shift and clutch operation agent mode. The control signal calculation is a function to calculate a control signal for an actuator or a device. The control signal includes at least a signal for PWM control of the inverter 16, and a signal for displaying information on the pseudo-engine speed meter 44. These functions of the controller 50 will be described below.

2. FUNCTIONS OF CONTROLLER 2-1. Motor Torque Calculation Function

Figure 4:
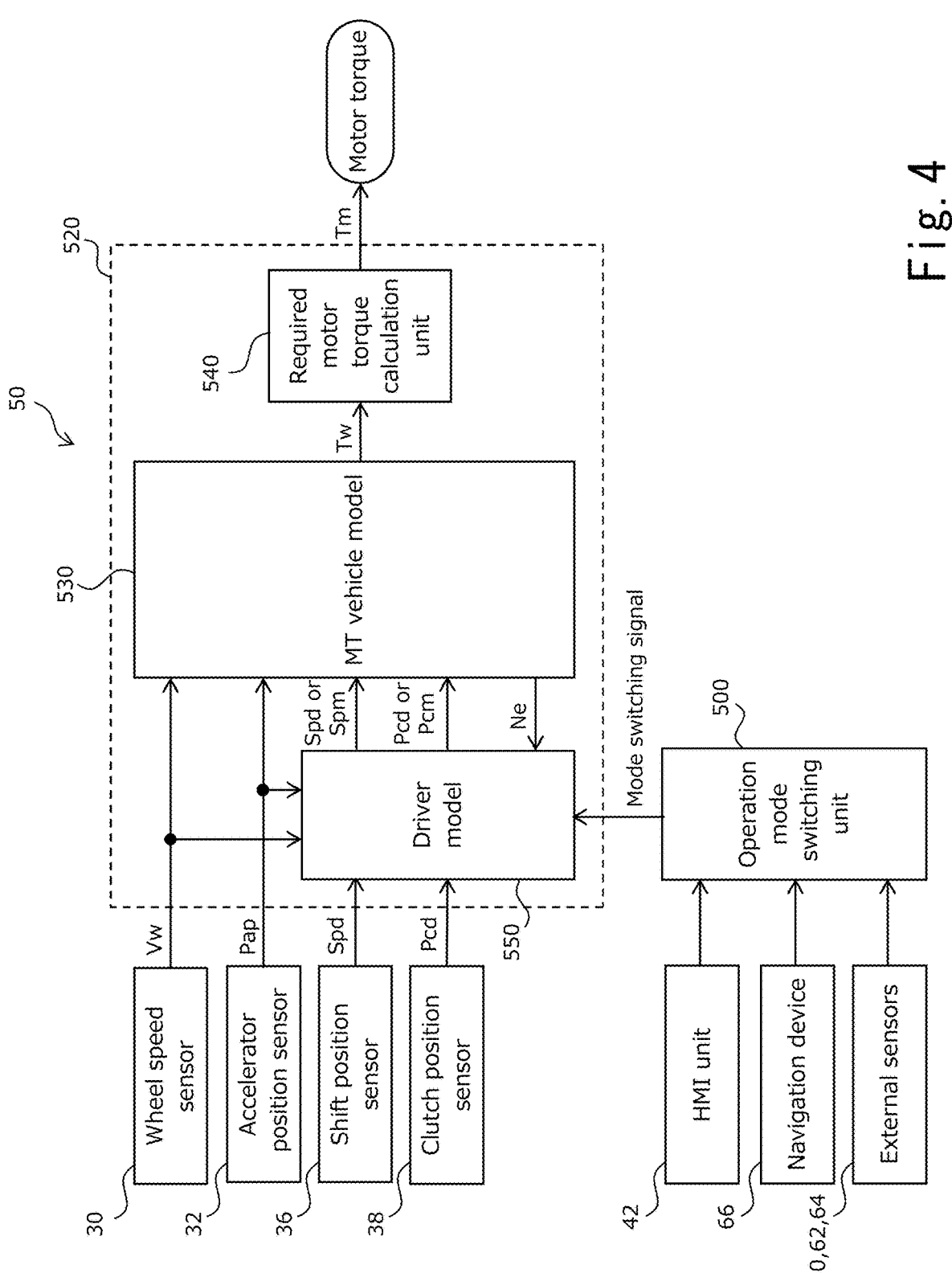
FIG. 4 is a block diagram illustrating functions of the controller of the electric vehicle shown in FIGS. 1 and 2.

FIG. 4 is a block diagram illustrating functions of the controller 50 according to the present embodiment, in particular, a function relating to a calculation of the motor torque command value for the electric motor 2. The controller 50 calculates the motor torque command value by the function shown in this block diagram, and generates the control signal for the PWM control of the inverter 16 based on the motor torque command value.

As shown in FIG. 4, the control signal calculation unit 520 comprises an MT vehicle model 530, a required motor torque calculation unit 540, and a driver model 550. The control signal calculation unit 520 receives signals from the wheel speed sensor 30, the accelerator position sensor 32, the shift position sensor 36, the clutch position sensor 38, and the rotation speed sensor 40. The control signal calculation unit 520 processes the signals from these sensors and calculates motor torque which the electric motor 2 is made to output.

The driving wheel torque of the MT vehicle is determined from the operation of a gas pedal that controls fuel supply to the engine, the operation of a gearshift that switches a gear stage of the MT, and the operation of a clutch pedal that operates a clutch between the engine and the MT. The MT vehicle model 530 is a model that calculates the driving wheel torque obtained by operating the accelerator pedal 22, the pseudo-clutch pedal 28, and the pseudo-gearshift 26 assuming that the electric vehicle 10 is equipped with the engine, the clutch, and the MT. Hereinafter, the engine, the clutch, and the MT, which are imaginarily realized by the MT vehicle model 530 in the MT mode, will be referred to as an imaginary engine, an imaginary clutch, and an imaginary MT.

The MT vehicle model 530 receives an accelerator opening Pap detected by the accelerator position sensor 32 as an operation amount of the gas pedal of the imaginary engine. A shift position Spd detected by the shift position sensor 36 is input to the MT vehicle model 530 as a shift position of the gearshift of the imaginary MT. Further, A clutch pedal depression amount Pcd detected by the clutch position sensor 38 is input to the MT vehicle model 530 as an operation amount of the clutch pedal of the imaginary clutch. The MT vehicle model 530 also receives a vehicle speed Vw (or wheel speed) detected by the wheel speed sensor 30 as a signal indicating the load condition of the vehicle. The detail of the MT vehicle model 530 will be described later.

The required motor torque calculation unit 540 converts the driving wheel torque Tw calculated by the MT vehicle model 530 into a required motor torque Tm. The required motor torque Tm is the motor torque required for realizing the driving wheel torque Tw calculated by the MT vehicle model 530. The reduction ratio from the output shaft 3 of the electric motor 2 to the driving wheels 8 is used to convert the driving wheel torque Tw into the required motor torque Tm.

The driver model 550 is a model simulating the operation of the clutch pedal or the operation of the gearshift and the clutch pedal of an exemplary driver driving the MT vehicle. The exemplary driver is an imaginary driver that serves as a model for operating the MT vehicle. The driver model 550 receives the shift position Spd detected by the shift position sensor 36 and the clutch pedal depression amount Pcd detected by the clutch position sensor 38. The vehicle speed Vw (or wheel speed) detected by the wheel speed sensor 30, the accelerator opening Pap detected by the accelerator position sensor 32, and the imaginary engine speed Ne calculated by the MT vehicle model 530 are also input to the driver model 550. The shift position Spd input to the MT vehicle model 530 can be switched to the shift position Spm calculated by the driver model 550. Further, the clutch pedal depression amount Pcd input to the MT vehicle model 530 can be switched to the clutch pedal depression amount Pcm calculated by the driver model 550. Details of the driver model 550 will be described later.

The driver model 550 receives a mode switching signal from the operation mode switching unit 500. The mode switching signal is a signal for switching a shift position signal input from the driver model 550 to the MT vehicle model 530 between the shift position Spd and the shift position Spm. The mode switching signal is also a signal for switching a clutch position signal input from the driver model 550 to the MT vehicle model 530 between the clutch pedal depression amount Pcd and the clutch pedal depression amount Pcm. The operation mode switching unit 500 receives signals from the HMI unit 42, the navigation device 66, and the external sensors 60, 63, 64. The operation mode switching unit 500 determines the mode switching signal to be output to the driver model 550 based on these signals. Details of the operation mode switching unit 500 will be described later.

2-2. MT Vehicle Model 2-2-1. Summary

Figure 5:
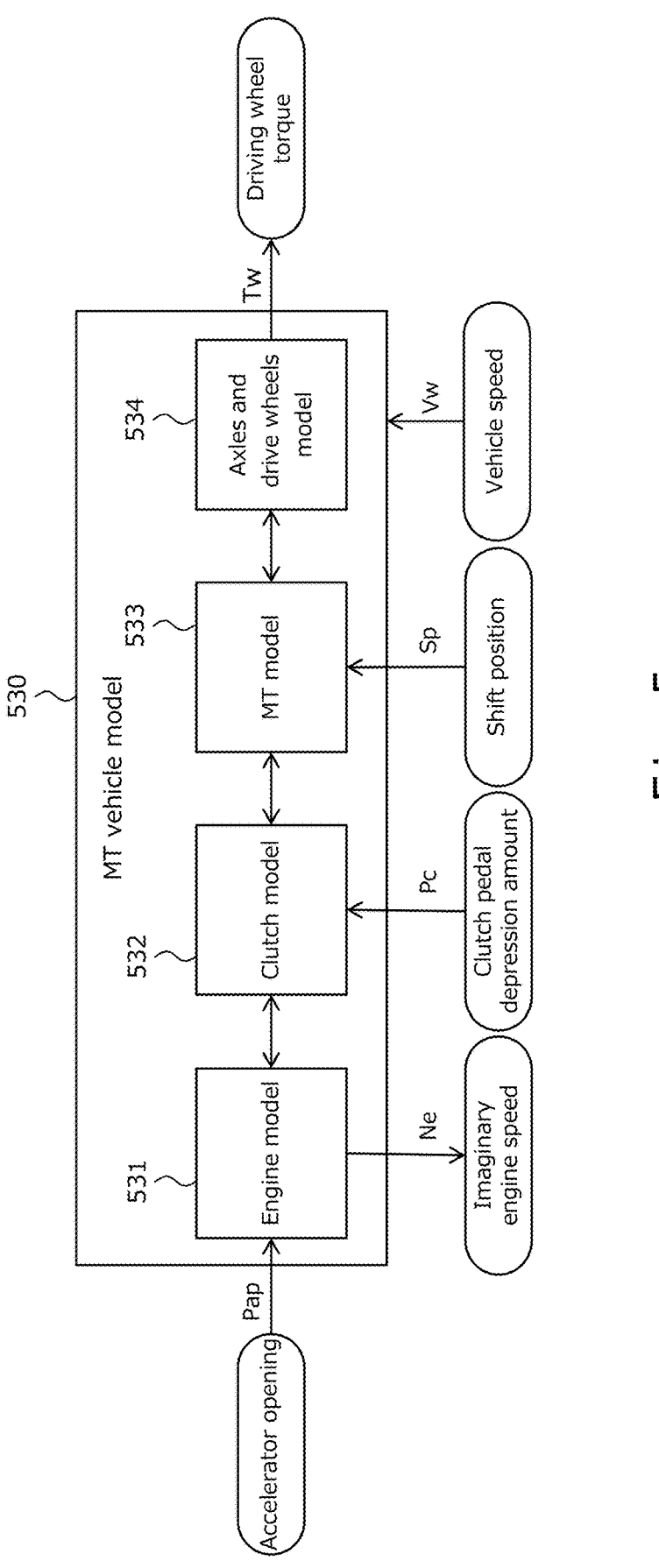
FIG. 5 is a block diagram illustrating an example of an MT vehicle model provided by the controller shown in FIG. 4.

Next, the MT vehicle model 530 will be described. FIG. 5 is a block diagram illustrating an example of the MT vehicle model 530. The MT vehicle model 530 comprises an engine model 531, a clutch model 532, an MT model 533, and an axles and drive wheels model 534. The engine model 531 is a model of the imaginary engine. The clutch model 532 is a model of the imaginary clutch. The MT model 533 is a model of the imaginary MT. The axles and drive wheels model 534 is a model of the imaginary torque transmission system from the axles to the driving wheels. Each model may be represented by a calculation formula or may be represented by a map.

Calculation results are input and output between models. Further, the accelerator opening Pap detected by the accelerator position sensor 32 is input to the engine model 531. A clutch pedal depression amount Pc is input to the clutch model 532. The clutch pedal depression amount Pc is the clutch pedal depression amount Pcd detected by the clutch position sensor 38 or the clutch pedal depression amount Pcm calculated by the driver model 550. A shift position Sp is input to the MT model 533. The shift position Sp is the shift position Spd detected by the shift position sensor 36 or the shift position Spm calculated by the driver model 550. Furthermore, in the MT vehicle model 530, the vehicle speed Vw (or wheel speed) detected by the wheel speed sensor 30 is used in a plurality of models. In the MT vehicle model 530, a driving wheel torque Tw and an imaginary engine speed Ne are calculated based on these input signals.

2-2-2. Engine Model

The engine model 531 calculates the imaginary engine speed Ne and an imaginary engine output torque Teout. The engine model 531 comprises a model to calculate the imaginary engine speed Ne and a model to calculate the imaginary engine output torque Teout. For calculating the imaginary engine speed Ne, for example, a model expressed by the following equation (1) is used. In the following equation (1), the imaginary engine speed Ne is calculated from a rotation speed Nw of the wheel 8, a total reduction ratio R, and a slip ratio Rslip of the imaginary clutch mechanism.

$$Ne = Nw \times \frac{1}{R} \times Rslip \tag{1}$$

In the equation (1), the rotation speed Nw of the wheel 8 is detected by the wheel speed sensor 30. The total reduction ratio R is calculated from a gear ratio r calculated by the MT model 533 to be described later and the reduction ratio specified by the axles and drive wheels model 534. The slip ratio Rslip is calculated by the clutch model 532 to be described later. The imaginary engine speed Ne is displayed on the pseudo-engine speed meter 44 when the MT mode is selected.

However, the equation (1) is an equation for calculating the imaginary engine speed Ne in a condition where the imaginary engine and the imaginary MT are connected by the imaginary clutch mechanism. When the imaginary clutch mechanism is disengaged, the imaginary engine torque Te generated in the imaginary engine can be regarded as being used to increase the imaginary engine speed Ne. The imaginary engine torque Te is a torque obtained by adding the torque due to the moment of inertia to the imaginary engine output torque Teout. When the imaginary clutch mechanism is disengaged, the imaginary engine output torque Teout is zero. Therefore, when the imaginary clutch mechanism is disengaged, the engine model 531 calculates the imaginary engine speed Ne by the following equation (2) using the imaginary engine torque Te and the moment of inertia J of the imaginary engine. For the calculation of the imaginary engine torque Te, a map with the accelerator opening Pap as a parameter is used.

$$J \times \frac{30}{\pi} \times \frac{d}{dt} Ne = Te \tag{2}$$

Incidentally, during idling of the MT vehicle, idle speed control (ISC control) is executed to maintain the engine speed at a constant rotation speed. Therefore, the engine model 531 calculates the imaginary engine speed Ne as a predetermined idling speed (for example, 1000 rpm), when the imaginary clutch mechanism is disengaged, the vehicle speed is 0, and the accelerator opening Pap is 0%. When the driver depresses the accelerator pedal 22 to perform racing while the vehicle is stopped, the idling speed is used as the initial value of the imaginary engine speed Ne calculated by equation (2).

Figure 6:
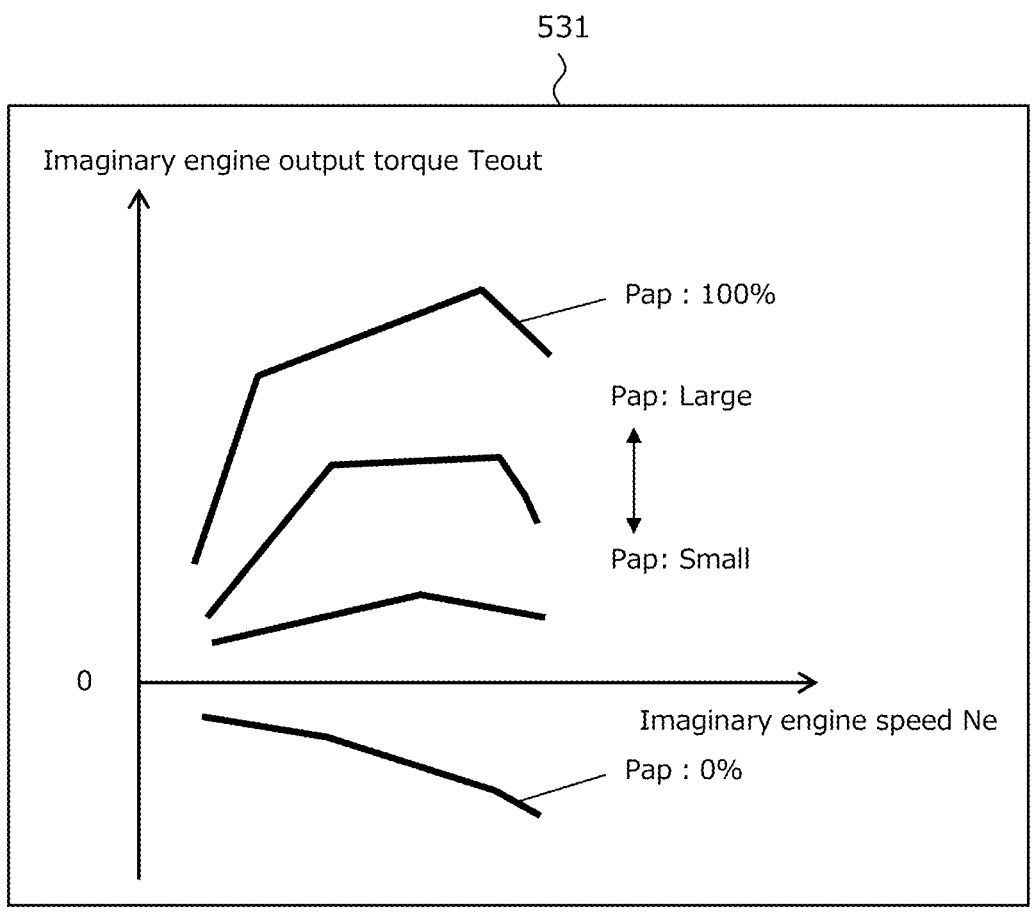
FIG. 6 is a diagram illustrating an example of an engine model constituting the MT vehicle model shown in FIG. 5.

The engine model 531 calculates the imaginary engine output torque Teout from the imaginary engine speed Ne and the accelerator opening Pap. For calculating the imaginary engine output torque Teout, for example, a two-dimensional map as shown in FIG. 6 is used. This two-dimensional map is a map defining the relationship between the accelerator opening Pap in steady-state, the imaginary engine speed Ne, and the imaginary engine output torque Teout. In this map, imaginary engine outputting torque Teout for imaginary engine speed Ne is given for each accelerator opening Pap. The torque characteristic shown in FIG. 7 can be set to the characteristic assumed for a gasoline engine or can be set to that assumed for a diesel engine. In addition, the torque characteristic can be set to that assumed for a natural intake engine or can be set to that assumed for a turbocharged engine. A selector switching the imaginary engine of the MT mode may be installed so that the driver can chose a preferred setting. The imaginary engine output torque Teout calculated by the engine model 531 is output to the clutch model 532.

2-2-3. Clutch Model

Figure 7:
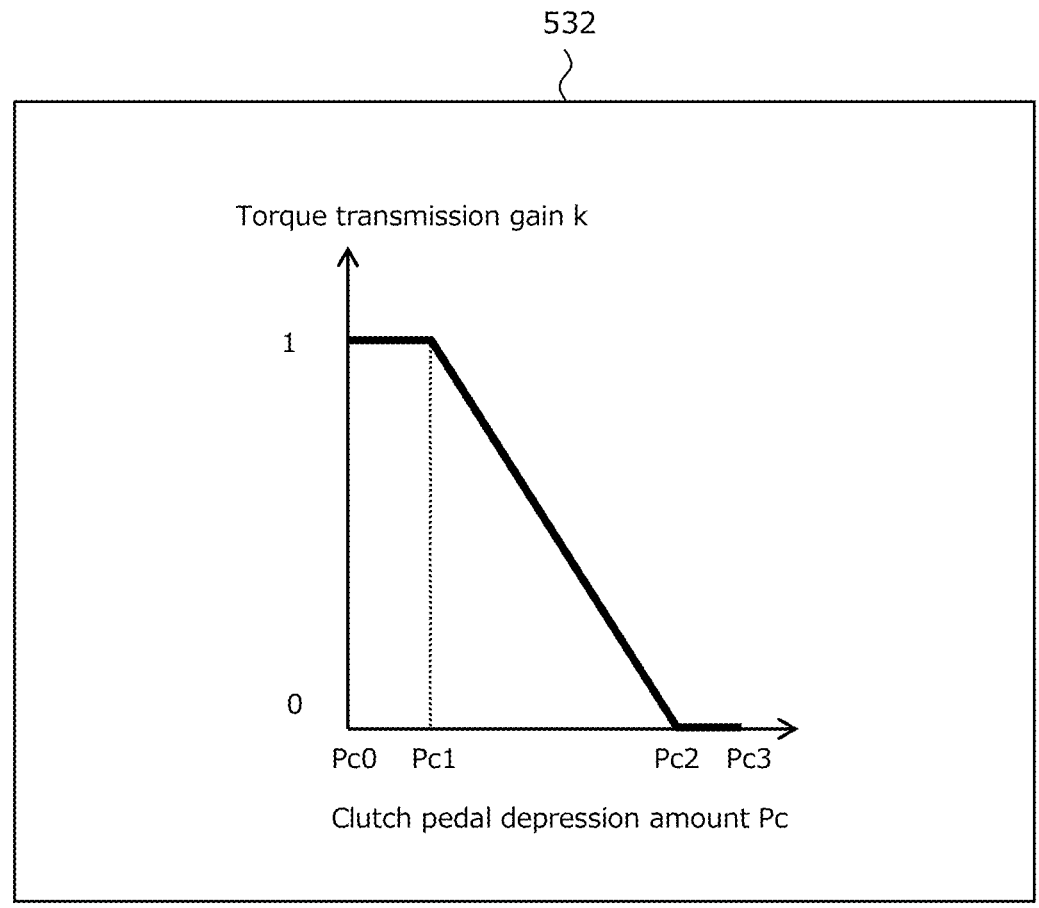
FIG. 7 is a diagram illustrating an example of a clutch model constituting the MT vehicle model shown in FIG. 5.

The clutch model 532 calculates a torque transmission gain k. The torque transmission gain k is a gain for calculating the torque transmission degree of the imaginary clutch corresponding to the depression amount of the pseudo-clutch pedal 28. The clutch model 532 has, for example, a map as shown in FIG. 7. In this map, the torque transmission gain k is given for the clutch pedal depression amount Pc. In FIG. 7, the torque transmission gain k is 1 when the clutch pedal depression amount Pc is in the range from Pc0 to Pc1, the torque transmission gain k monotonically decreases at a constant slope when the clutch pedal depression amount Pc is in the range from Pc1 to Pc2, and the torque transmission gain k is 0 when the clutch pedal depression amount Pc is in the range from Pc2 to Pc3. Here, Pc0 corresponds to the position where the clutch pedal depression amount Pc is 0%, Pc1 corresponds to the position of the play limit when the clutch pedal is depressed, Pc3 corresponds to the position where the clutch pedal depression amount Pc is 100%, and Pc2 corresponds to the play limit when the clutch pedal is returned from Pc3.

The map shown in FIG. 7 is an example. The change in the torque transmission gain k with respect to an increase in the clutch pedal depression amount Pc is not limited to the change curve shown in FIG. 8 as long as it is a broad monotonic decrease toward 0. For example, the change in the torque transmission gain k in the range from Pc1 to Pc2 may be a monotonically decreasing curve that is convex upward or a monotonically decreasing curve that is convex downward.

The clutch model 532 calculates a clutch output torque Tcout using the torque transmission gain k. The clutch output torque Tcout is the torque output from the imaginary clutch. The clutch model 532 calculates the clutch output torque Tcout from the imaginary engine output torque Teout and the torque transmission gain k by, for example, the following equation (3). The clutch output torque Tcout calculated by the clutch model 532 is output to the MT model 533.

$$Tcout = Teout \times k \tag{3}$$

Further, the clutch model 532 calculates the slip ratio Rslip. The slip ratio Rslip is used to calculate the imaginary engine speed Ne in the engine model 531. The slip ratio Rslip can be calculated by using a map in which the slip ratio Rslip is given to the clutch pedal depression amount Pc, in the same manner as the torque transmission gain k. Instead of such a map, the slip ratio Rslip may be calculated from the torque transmission gain k by the following equation (4) representing a relation between the slip ratio Rslip and the torque transmission gain k.

$$Rslip = 1 - k \tag{4}$$

2-2-4. MT Model

Figure 8:
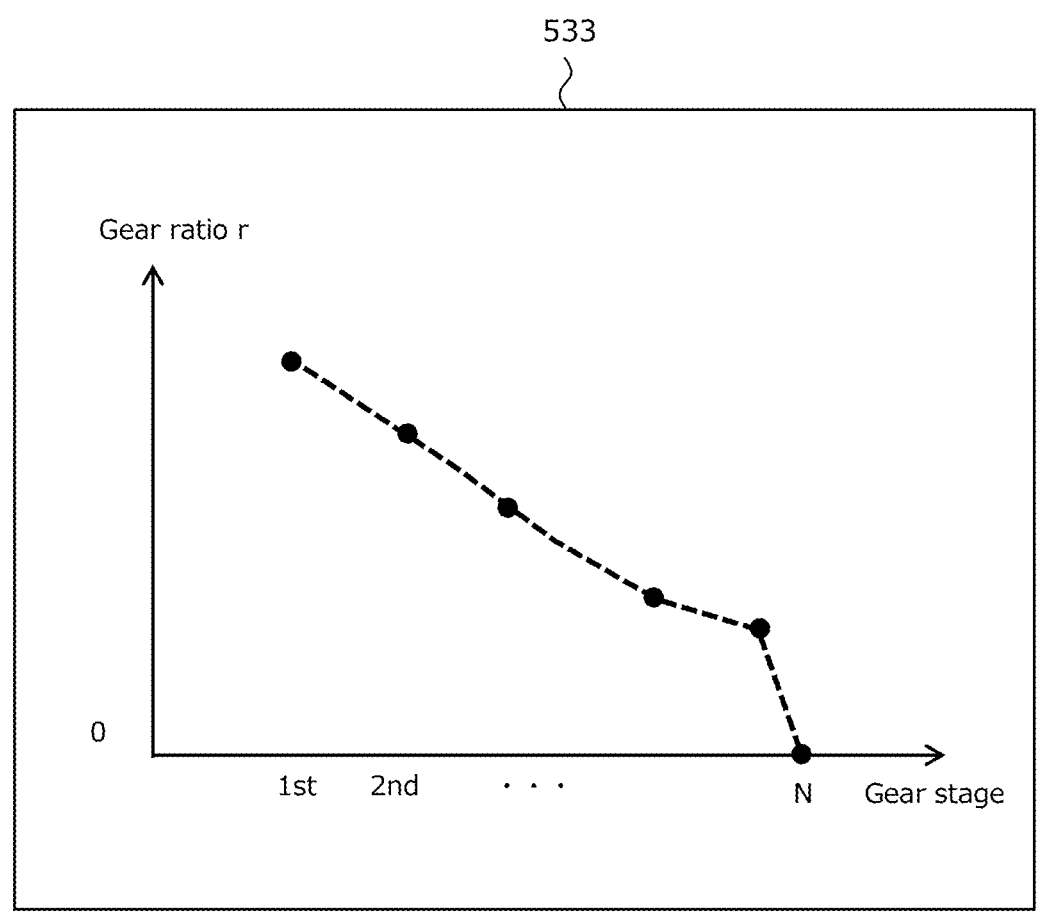
FIG. 8 is a diagram illustrating an example of an MT model constituting the MT vehicle model shown in FIG. 5.

The MT model 533 calculates the gear ratio r. The gear ratio r is the gear ratio determined from the shift position Sp of the pseudo-gearshift 26 in the imaginary MT. The shift position Sp of the pseudo-gearshift 26 and the gear stage of the imaginary MT are in a one-to-one relation. The MT model 533 has, for example, a map as shown in FIG. 8. In this map, the gear ratio r is given for the gear stage. As shown in FIG. 8, the larger gear stage, the smaller the gear ratio r.

The MT model 533 calculates a transmission output torque Tgout using the gear ratio r. The transmission output torque Tgout is the torque output from the imaginary transmission. The MT model 533 calculates the transmission output torque Tgout from the clutch output torque Tcout and the gear ratio r by, for example, the following equation (5). The transmission output torque Tgout calculated by the MT model 533 is output to the axles and drive wheels model 534.

$$Tgout = Tcout \times r \tag{5}$$

2-2-5. Axles and Drive Wheels Model

The axles and drive wheels model 534 calculates the driving wheel torque Tw using a predetermined reduction ratio rr. The reduction ratio rr is a fixed value determined by the mechanical structure from the imaginary MT to the driving wheels 8. The value obtained by multiplying the reduction ratio rr by the gear ratio r is the total reduction ratio R described above. The axles and drive wheels model 534 calculates the driving wheel torque Tw from the transmission output torque Tgout and the reduction ratio rr by, for example, the following equation (6). The driving wheel torque Tw calculated by the axles and drive wheels model 534 is output to the required motor torque calculation unit 540.

$$Tw = Tgout \times rr \tag{6}$$

Figure 9:
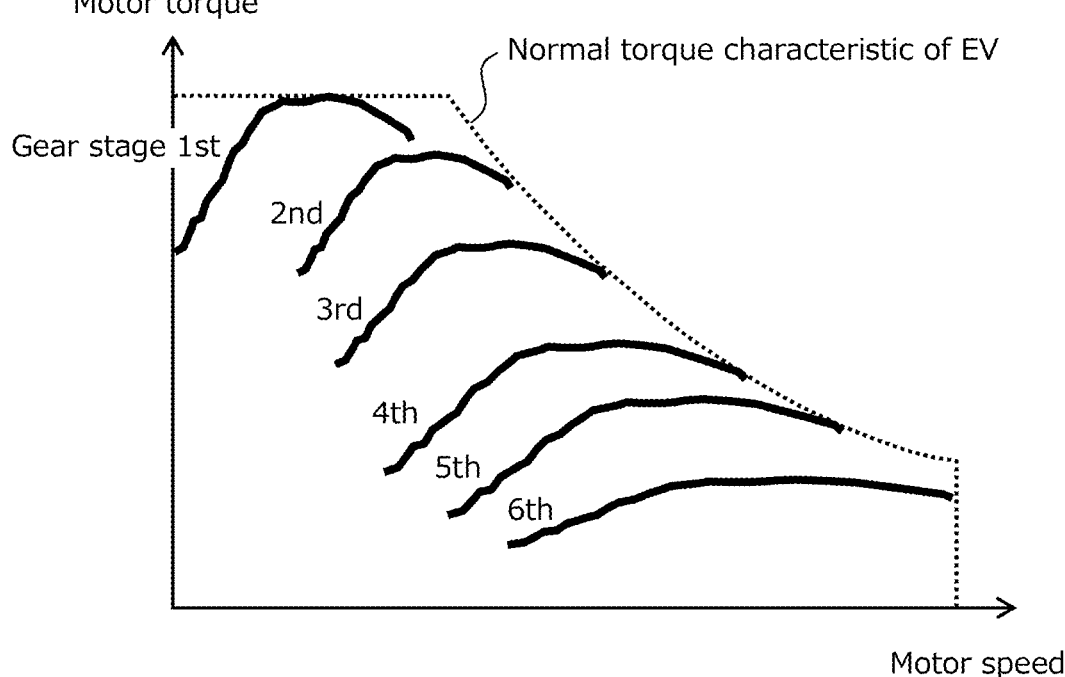
FIG. 9 is a diagram illustrating a torque characteristic of an electrical motor realized by motor control using the MT vehicle model in comparison with a torque characteristic of the electric motor realized by normal motor control for an EV.

2-2-6. Torque Characteristic of Electric Motor Realized by Motor Control Using MT Vehicle Model The required motor torque calculation unit 540 converts the driving wheel torque Tw calculated by the MT vehicle model 530 into motor torque. FIG. 9 is a diagram illustrating the torque characteristic of the electrical motor 2 realized by motor control using the MT vehicle model 530 in comparison with the torque characteristic of the electric motor realized by normal motor control for the EV. According to the motor control using the MT vehicle model 530, as shown in FIG. 9, it is possible to realize a torque characteristic (solid line in the drawing) such as to simulate the torque characteristic of the MT vehicle according to the gear stage set by the pseudo-gearshift 26.

2-3. Operation Mode Selection Function 2-3-1. Summary of Each Operation Mode

According to the MT vehicle model 530 described above, by reflecting the operation of the pseudo-gearshift 26 and the pseudo-clutch pedal 28 by the driver to the motor torque, the driver can drive the electric vehicle 10 like the MT vehicle. However, for the driver who is not familiar with the operation of the MT vehicle, there are many scenes in which the driver feels difficulty in the clutch operation and the shift operation. Further, even if the driver is familiar with the operation of the MT vehicle, there is a possibility that the driver may want to drive easily without the clutch operation or the shift operation. As a countermeasure to such a problem, the controller 50 is provided with a function of performing the clutch operation and the shift operation on behalf of the driver. Specifically, the following three operation modes are provided as modes of the clutch operation and the shift operation by the driver.

First, the first operation mode provided by the controller 50 is a mode in which the operation of the pseudo-clutch pedal 28 and the operation of the pseudo-gearshift 26 are reflected in the control of the electric motor 2. In the first operation mode, the driver can control the motor torque by the operation of the pseudo-clutch pedal 28 and the operation of the pseudo-gearshift 26 to drive the electric vehicle 10 like the MT vehicle. Hereinafter, the first operation mode is referred to as the manual operation mode.

The second operation mode provided by the controller 50 is a mode in which the operation of the pseudo-clutch pedal 28 is not required in the control of the electric motor 2. In the second operation mode, the clutch operation required to drive the MT vehicle is performed by the controller 50 on behalf of the driver. Hereinafter, the second operation mode is referred to as the clutch operation agent mode.

The third operation mode is a mode in which the operation of the pseudo-gearshift 26 and the operation of the pseudo-clutch pedal 28 are not required in the control of the electric motor 2. In the third operation mode, both the clutch operation and the shift operation required to drive the MT vehicle are performed by the controller 50 on behalf of the driver. Hereinafter, the third operation mode is referred to as the shift and clutch operation agent mode.

2-3-2. Operation Mode Switching Unit

Switching of the above three operation modes is performed by the operation mode switching unit 500. The operation mode switching unit 500 includes a mode switching signal output unit 502 and an automatic switching determination unit 504. The mode switching signal output unit 502 outputs the mode switching signal corresponding to the operation mode selected by the HMI unit 42 to the driver model 550. The automatic switching determination unit 504 functions when the operation mode selected by the HMI unit 42 is the automatic switching mode. The signal from the navigation device 66 and the signals from the external sensors 60, 63, 64 are input to the automatic switching determination unit 504

The mode switching signal output unit 502 sets a manual operation flag 502a when the manual operation mode is selected by the HMI unit 42. When the manual operation flag 502a is set, a mode switching signal instructing switching to the manual operation mode is input from the mode switching signal output unit 502 to the driver model 550.

The mode switching signal output unit 502 sets a clutch operation agent flag 502b when the clutch operation agent mode is selected by the HMI unit 42. When the clutch operation agent flag 502b is set, a mode switching signal instructing switching to the clutch operation agent mode is input from the mode switching signal output unit 502 to the driver model 550.

The mode switching signal output unit 502 sets a shift and clutch operation agent flag 502c when the shift and clutch operation agent mode is selected with the HMI unit 42. When the shift and clutch operation agent flag 502c is set, a mode switching signal instructing switching to the shift and clutch operation agent mode is input from the mode switching signal output unit 502 to the driver model 550.

2-3-3. Automatic Switching of Operation Mode According to Driving Scene

The automatic switching determination unit 504 includes a driving scene registration unit 504a. In the driving scene registration unit 504a, a typical scene in which the driver wants the clutch operation to be performed on behalf of the driver and a typical scene in which the driver wants both the shift operation and the clutch operation to be performed on behalf of the drive are stored in advance. When the automatic switching mode is selected by the HMI unit 42, the automatic switching determination unit 504 automatically selects the operation mode suitable for the current driving scene among the manual operation mode, the clutch operation agent mode, and the shift and clutch operation agent mode.

Examples of the scenes in which the driver wants the clutch operation to be performed on behalf of the driver are as follows: reverse, a sharp curve, a traffic jam, a railroad crossing, a garage, and a gravel road. In the driving scene registration unit 504a, these scenes are registered in association with the clutch operation agent mode. And, a traffic jam is an example of the scene in which the driver wants both the shift operation and the clutch operation to be performed on behalf of the drive. In the driving scene registration unit 504a, such a scene is registered in association with the shift and clutch operation agent mode. The automatic switching determination unit 504 selects an operation mode suitable for the current driving scene in accordance with the data registered in the driving scene registration unit 504a, and inputs the selected operation mode to the mode switching signal output unit 502. Incidentally, the manual operation mode is selected as the basic mode in the automatic switching determination unit 504. Switching of the operation mode from the manual operation mode to the clutch operation agent mode or from the manual operation mode to the shift and clutch operation agent mode is performed only in the scene registered in the driving scene registration unit 504a.

2-3-4. Machine Learning of Operation Mode

The automatic switching determination unit 504 includes a machine learning unit 504b. When the driver selects the manual operation mode, the clutch operation agent mode, or the shift and clutch operation agent mode with the HMI unit 42, the machine learning unit 504b identifies the driving scene in which the selection has been made. For the identification of the driving scene, the location information of the self vehicle on the map obtained by the navigation device 66, and the peripheral information of the self vehicle obtained by the external sensors 60, 62, and 64 are used. Based on these information, the machine learning unit 504b identifies what kind of driving scene the vehicle is in at present.

The machine learning unit 504b performs machine learning to learn the relationship between the operation mode selected by the driver with the HMI unit 42 and the driving scene at the selected time. For example, supervised learning is used for the machine learning by the machine learning unit 504b. In the supervised learning, the teacher data that uses the operation mode selected with the HMI unit 42 as an output and the driving scene at the selected time as an input is used. As the algorithm of the supervised learning, k-neighborhood method, decision tree, random forest, support vector machine, logistic regression, and neural network including deep learning, etc. can be used.

2-4. Driver Model 2-4-1. Functions in Manual Operation Mode

Next, the driver model 550 will be described. The function of the driver model 550 depends on the operation mode. In the manual operation mode, which is the basic operation mode, the driver model 550 does not function. In FIG. 4, the shift position Spd input from the shift position sensor 36 to the driver model 550 is input from the driver model 550 to the MT vehicle model 530 as it is. Further, the clutch pedal depression amount Pcd input from the clutch position sensor 38 to the driver model 550 is input from the driver model 550 to the MT vehicle model 530 as it is. That is, in the manual operation mode, the operation of the pseudo-clutch pedal 28 and the operation of the pseudo-gearshift 26 are reflected in the calculation of the motor torque using the MT vehicle model 530. This allows the driver to enjoy the clutch operation and the shift operation like the MT vehicle.

2-4-2. Functions in Clutch Operation Agent Mode

Figure 11:
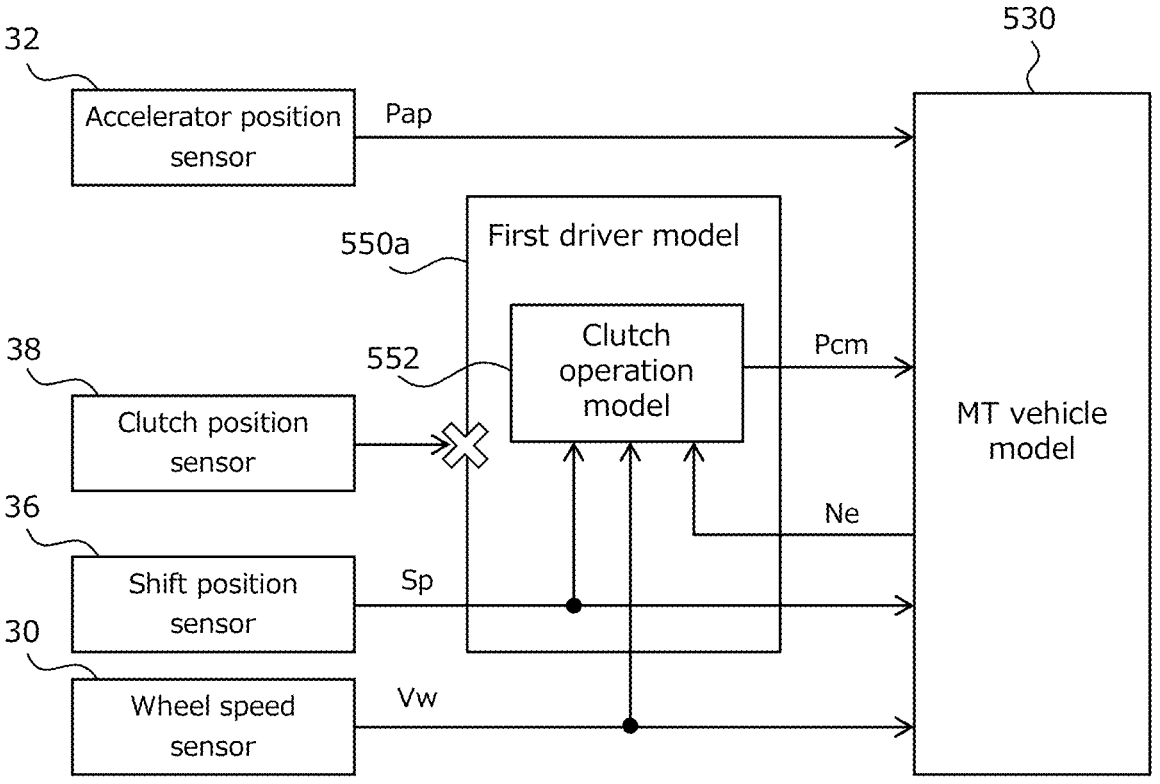
FIG. 11 is a diagram illustrating a function of the driver model provided in the controller shown in FIG. 4 in a clutch operation agent mode.

When switching from the manual operation mode to the clutch operation agent mode is instructed by the operation mode switching unit 500, the driver model 550 functions as a first driver model 550a shown in FIG. 11. In the first driver model 550a, the signal from the clutch position sensor 38 is not used, and the operation of the pseudo-clutch pedal 28 by the driver is disabled.

The first driver model 550a includes a clutch operation model 552. The clutch operation model 552 is a model simulating the clutch operation of the exemplary driver. The clutch operation model 552 receives the vehicle speed Vw (or wheel speed) detected by the wheel speed sensor 30, the imaginary engine speed Ne, and a signal from the shift position sensor 36.

In the clutch operation model 552, the signal from the shift position sensor 36 is used to time the clutch operation. The clutch operation model 552 sets the clutch pedal depression amount Pcm input to the MT vehicle model 530 to a maximum value so as to disengage the imaginary clutch mechanism when the shift operation of the driver is detected from the signal from the shift position sensor 36.

In the clutch operation model 552, the vehicle speed Vw and the imaginary engine speed Ne are used to calculate the clutch pedal depression amount Pcm. In order to smoothly match a rotation speed of an input shaft of the imaginary MT calculated from the vehicle speed Vw and the imaginary engine speed Ne, the clutch operation model 552 calculates the clutch pedal depression amount Pcm based on a rotation speed difference between the rotation speed of the input shaft of the imaginary MT and the imaginary engine speed Ne.

As described above, in the clutch operation agent mode, since the clutch pedal depression amount Pcm is calculated by the first driver model 550a, the pseudo-clutch pedal 28 does not need to be operated. Therefore, the driver does not have to experience difficulties peculiar to the MT vehicle with the clutch operation. This allows the driver to enjoy the driving feeling like the MT vehicle in the electric vehicle 10 without any difficulty peculiar to the MT vehicle.

2-4-3. Function in Shift and Clutch Operation Agent Mode

When switching from the manual operation mode to the shift and clutch operation agent mode is instructed by the operation mode switching unit 500, the driver model 550 functions as a second driver model 550b shown in FIG. 12. In the second driver model 550b, the signal from the clutch position sensor 38 is not used and the operation of the pseudo-clutch pedal 28 by the driver is disabled. At the same time, no signal from the shift position sensor 36 is used, and the operation of the pseudo-gearshift 26 by the driver is also disabled.

The second driver model 550b includes a clutch operation model 552 and a shift operation model 554. The shift operation model 554 is a model simulating a shift operation of the exemplary driver. The shift operation model 554 receives the vehicle speed Vw (or wheel speed) detected by the wheel speed sensor 30, and the imaginary engine speed Ne. The clutch operation model 552 is common to that of the first driver model 550a. However, in the second driver model 550b, a signal for timing the clutch operation is input to the clutch operation model 552 from the shift operation model 554.

The shift operation model 554 uses a shift pattern map that defines the relationship between the vehicle speed Vw, the imaginary engine speed Ne, and the gear stage of the imaginary MT. The shift position Spm input from the shift operation model 554 to the MT vehicle model 530 corresponds one-to-one to the gear stage of the imaginary MT. The shift pattern map is prepared separately for upshifting and for downshifting.

The shift operation model 554 determines the shift position Spm at accelerating using the shift pattern map for upshifting. The shift pattern map, for example, is configured such that an upshift is performed when the imaginary engine speed Ne is increased to a predetermined upshift reference speed. The upshift reference speed is the engine speed in front of the torque band in the engine model 531, and is set for each gear stage.

The shift operation model 554 determines the shift position Spm at decelerating using the shift pattern map for downshifting. This shift pattern map, for example, is configured such that a downshift is performed when the imaginary engine speed Ne is reduced to a predetermined downshift reference speed. The downshift reference speed is set to a lower engine speed than the upshift reference speed.

As described above, in the shift and clutch operation agent mode, the shift position Spm and the clutch pedal depression amount Pcm are calculated by the second driver model 550b. Therefore, the driver does not need to operate the pseudo-clutch pedal 28 and does not need to operate the pseudo-gearshift 26. Therefore, the driver does not have to experience difficulties peculiar to the MT vehicle with the clutch operation and the shift operation. This allows the driver to enjoy the driving feeling like the MT vehicle in the electric vehicle 10 without any difficulty peculiar to the MT vehicle.

3. OTHER

The electric vehicle 10 according to the above embodiment is an FF vehicle that drives the front wheels in one electric motor 2. However, the present disclosure is also applicable to an electric vehicle in which two electric motor are arranged in front and rear to drive each of the front and rear wheels. The present disclosure is also applicable to an electric vehicle comprising an in-wheel motor on each wheel. The MT vehicle model of these cases may be a model in which an all-wheel-drive vehicle with MT is modeled.

The electric vehicle 10 according to the above embodiment is not provided with a transmission. However, the present disclosure is also applicable to an electric vehicle having a stepped or continuously variable automatic transmission. In this case, the power train consisting of the electric motor and the automatic transmission may be controlled so as to output the motor torque calculated by MT vehicle model.

In the above embodiment, the operation mode switching unit 500 constitutes an operation mode selector together with the HMI unit 42. Although the operation mode switching unit 500 is one function of the controller 50, all of the functions of the operation mode switching unit 500 may be transferred to the HMI unit 42. That is, the HMI unit 42 itself may be configured as an operation mode selector.

What is claimed is:

1. An electric vehicle configured to use an electric motor as a power device for traveling, the electric vehicle comprising:

a controller having an operation mode in which the electric motor is operated to simulate a torque characteristic of a manual transmission vehicle by using a manual transmission model, the manual transmission model being a model of an imaginary manual transmission, 5 wherein the operation mode includes an automatic shift mode in which a gear stage of the imaginary manual transmission is automatically shifted and a manual shift mode in which the gear stage of the imaginary manual 10 transmission is manually shifted by a driver, and the controller automatically switches the operation mode in response to detection of a predetermined condition.

2. The electric vehicle according to claim 1, further comprising: 15 a pseudo-gearshift configured to allow manual shifting of the gear stage of the imaginary manual transmission, wherein the manual shift mode is performed by operating the pseudo-gearshift.

3. The electric vehicle according to claim 2, further 20 comprising:

a pseudo-clutch pedal configured to allow manual shifting of the gear stage of the imaginary manual transmission when operated together with the pseudo-gearshift, wherein the manual shift mode is performed by operating 25 the pseudo-gearshift and the pseudo-clutch pedal.

* * * * *